United States Patent
AF Klercker Alakula

(10) Patent No.: US 7,663,334 B2
(45) Date of Patent: Feb. 16, 2010

(54) SYNCHRONOUS MACHINES

(75) Inventor: Mats H. A. AF Klercker Alakula, Kavlinge (SE)

(73) Assignee: Forskarpatent I Syd AB, Lund (SE)

(*) Notice: Subject to any disclaimer, the term of this patent is extended or adjusted under 35 U.S.C. 154(b) by 0 days.

(21) Appl. No.: 12/103,917

(22) Filed: Apr. 16, 2008

(65) Prior Publication Data

US 2008/0211448 A1    Sep. 4, 2008

Related U.S. Application Data

(63) Continuation of application No. 11/229,754, filed on Sep. 19, 2005, now abandoned, which is a continuation of application No. PCT/SE2004/000396, filed on Mar. 17, 2004.

(30) Foreign Application Priority Data

Mar. 19, 2003   (SE)   .................................. 0300757

(51) Int. Cl.
    *H02P 21/00*   (2006.01)
(52) U.S. Cl. .................. 318/716; 318/705; 318/713; 318/714; 318/715; 310/162; 310/171; 310/261; 310/267
(58) Field of Classification Search .................. 318/716, 318/700, 794, 713, 714, 715, 705; 310/162–166, 310/171, 261, 267
    See application file for complete search history.

(56) References Cited

U.S. PATENT DOCUMENTS

| | | | | |
|---|---|---|---|---|
| 3,582,736 A | 6/1971 | Geib, Jr. | | |
| 3,678,352 A * | 7/1972 | Bedford | .................. | 318/400.41 |
| 3,757,182 A | 9/1973 | Chalmers et al. | | |
| 4,114,073 A * | 9/1978 | Uzuka | .................... | 318/400.11 |
| 5,012,148 A | 4/1991 | Vithayathil | | |
| 5,770,909 A * | 6/1998 | Rosen et al. | ................. | 310/113 |
| 5,933,573 A * | 8/1999 | Lukenich et al. | ............ | 388/811 |
| 6,051,953 A | 4/2000 | Vithayathil | | |
| 6,664,704 B2 * | 12/2003 | Calley | ........................ | 310/257 |
| 6,847,186 B1 * | 1/2005 | Kerlin | ........................ | 318/751 |
| 2002/0074803 A1 * | 6/2002 | Kajiura | .................... | 290/40 F |

FOREIGN PATENT DOCUMENTS

| | | |
|---|---|---|
| GB | 2 047 020 | 4/1980 |
| JP | 49-114001 | 10/1974 |
| JP | 57-199462 | 12/1982 |
| JP | 01-185198 | 7/1989 |
| JP | 02-065700 | 3/1990 |
| JP | 07-170797 | 7/1995 |
| JP | 2002-112592 | 4/2002 |

OTHER PUBLICATIONS

Office Action issued on May 21, 2009 from the Japanese Patent Office for corresponding Patent Application No. 2006-507968, with partial translation.

* cited by examiner

*Primary Examiner*—Rita Leykin
(74) *Attorney, Agent, or Firm*—Gauthier & Connors LLP

(57) ABSTRACT

The present invention relates to electrically magnetized synchronous machine comprising an electrically magnetized rotor, and electrically supplied sator windings, whereby it further comprises non-linear means, optionally controllable, such as rectifying means in a series with three sator phase windings, whereby a rotor field winding is arranged to be fed from said non-linear means.

17 Claims, 3 Drawing Sheets

SYNCHRONOUS MACHINES

PRIORITY INFORMATION

The present application is a continuation application of U.S. Patent Application Ser. No. 11/229,754, filed on Sep. 19, 2005, which is a continuation of International Patent Application No. PCT/SE2004/000396, filed on Mar. 17, 2004, which claims priority to Swedish Patent Application No. 0300757-2, filed on Mar. 19, 2003.

TECHNICAL FIELD

The present invention relates to synchronous machines, and in particular to series magnetization of synchronous machines.

BACKGROUND OF THE INVENTION

Permanent magnet synchronous machines (PMSM) are getting increasingly more popular due to their high torque and power density. The main drawbacks are the magnet price, the difficulties with field weakening, and possibly the assembly/disassembly that is somewhat difficult due to high forces emanating from the magnets.

Another problem is that the metals used in alloys for producing permanent magnets are a restricted nature resource, and from a global environmental point of view there is a requirement for less use of such metals, as there is no endless source thereof.

Electrically magnetized synchronous machines (EMSM) have almost the same properties as permanent magnet synchronous machines. However, one drawback thereof is the need for a field winding in the rotor, and a corresponding power supply and slip rings or rotary transformer plus rectifier to deal with the magnetization. An advantage using electrically magnetized synchronous machines compared to permanent magnet synchronous machines is the ease of carrying out field weakening.

SUMMARY OF THE INVENTION

The present invention is based on the concept of connecting a non-linear means, optionally controllable, such as rectifying means, in series with the three stator phase windings of an electrically magnetized synchronous machine and to feed the field winding from the non-linear means.

By doing so the field current will always become equal to the largest modulus of the three phase currents and being independent of the phase angle of the phase currents.

This provides for further advantages to the electrically magnetized synchronous machine, such as that no additional power supply is needed for the field winding, and that the electrically magnetized synchronous machine will obtain permanent magnet synchronous machine properties but with variable magnetization.

Another advantage is that cos $\phi$, i.e., the phase displacement, can be held equal to or about 1, i.e., no or substantially no phase displacement, which minimizes the load on any power electronics.

In order to distinguish the present construction from prior electrically magnetized synchronous machine and permanent magnet synchronous machine the novel construction has been named SMSM—series magnetized synchronous machine.

The present invention has been theoretically and experimentally studied. Thereby it turned out to work well, also in combination with a field oriented control.

The invention will now be described more in detail with reference to the accompanying drawings, however, without being restricted thereto.

DETAILED DESCRIPTION OF THE INVENTION

Figure 1:
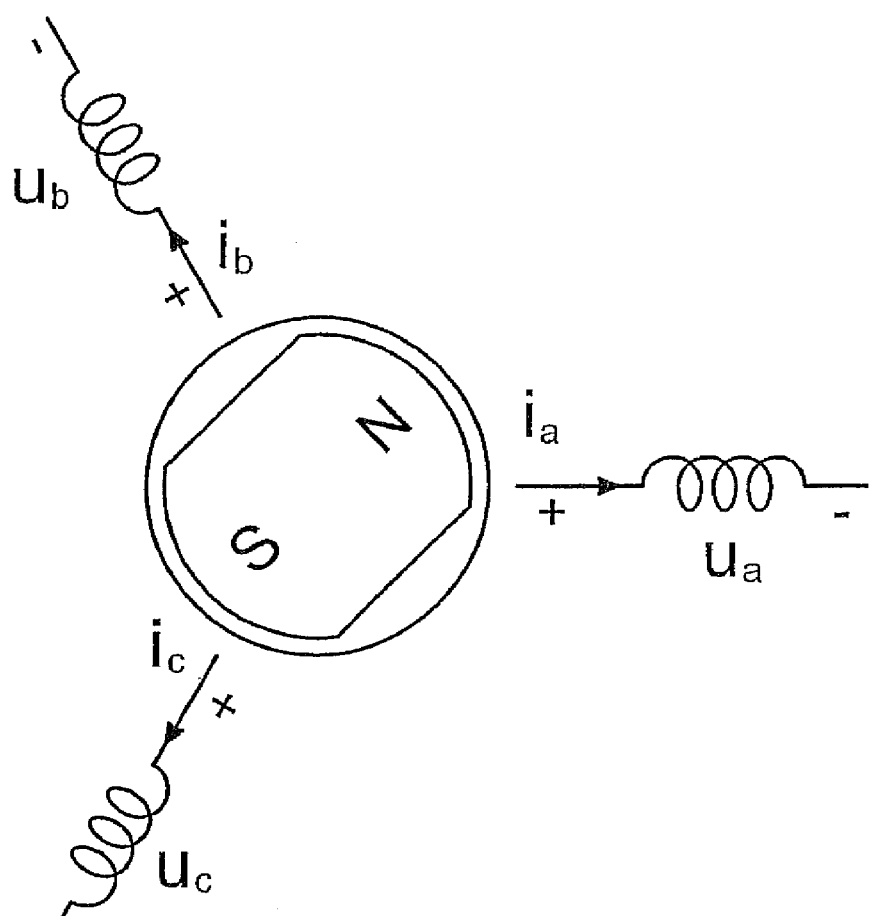
FIG. 1 shows the principles of a permanent magnet synchronous machine, (prior art)

In FIG. 1 showing the prior art PMSM, the permanent magnet connected to the outgoing shaft of the machine, is symbolized by an N-S marked rotor, and the stator windings are shown with symbolized winding and the stator currents are denoted $i_a$, $i_b$, and $i_c$, respectively, together with their respective voltages $u_a$, $u_b$, and $u_c$, respectively. In the PMSM a current is only applied to the stator, and there is no need for transfer of current to the rotor, the function of the field winding is supplied by permanently magnetic material.

Figure 2:
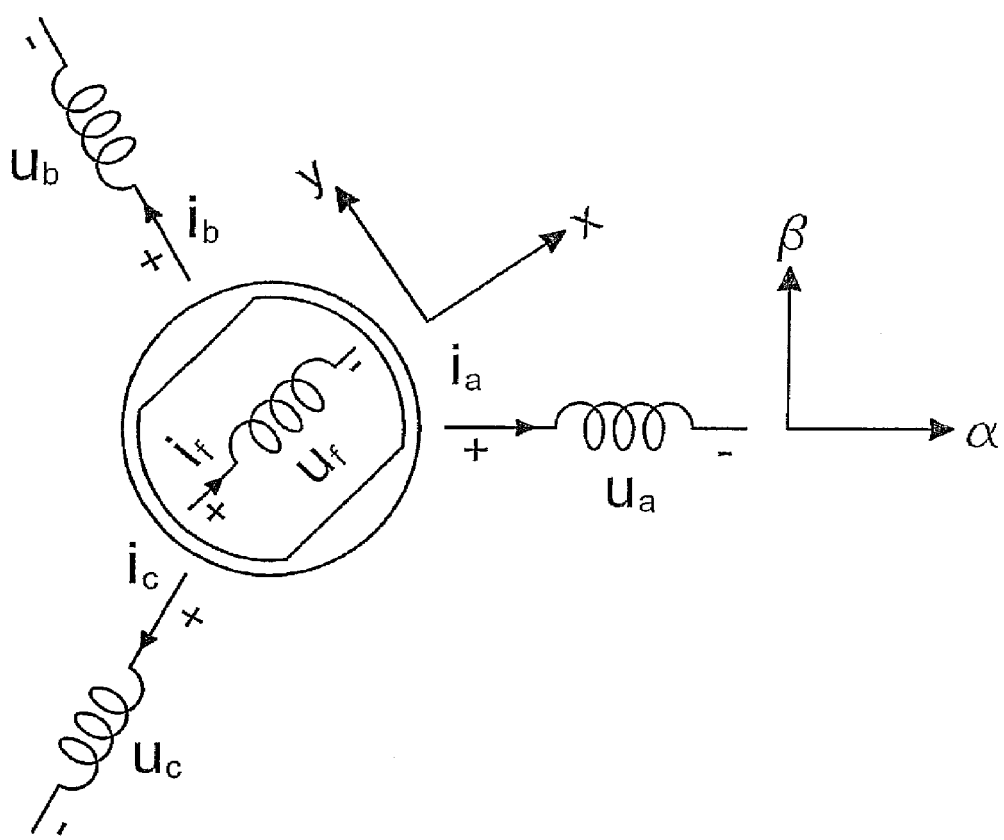
FIG. 2 shows the principle of an electrically magnetized synchronous machine, (prior art)

In FIG. 2 the electrically magnetized rotor connected to the outgoing shaft is shown with a symbolized winding. The stator windings with symbolized winding and the stator currents are denoted $i_a$, $i_b$, and $i_c$, respectively, together with their respective voltages $u_a$, $u_b$, and $u_c$, respectively. The angle θ is given between the phase and the axis of the rotor. In the EMSM a current is applied to the stator, as well as to the field winding via a separate electric line being fed via slip rings.

Figure 3:
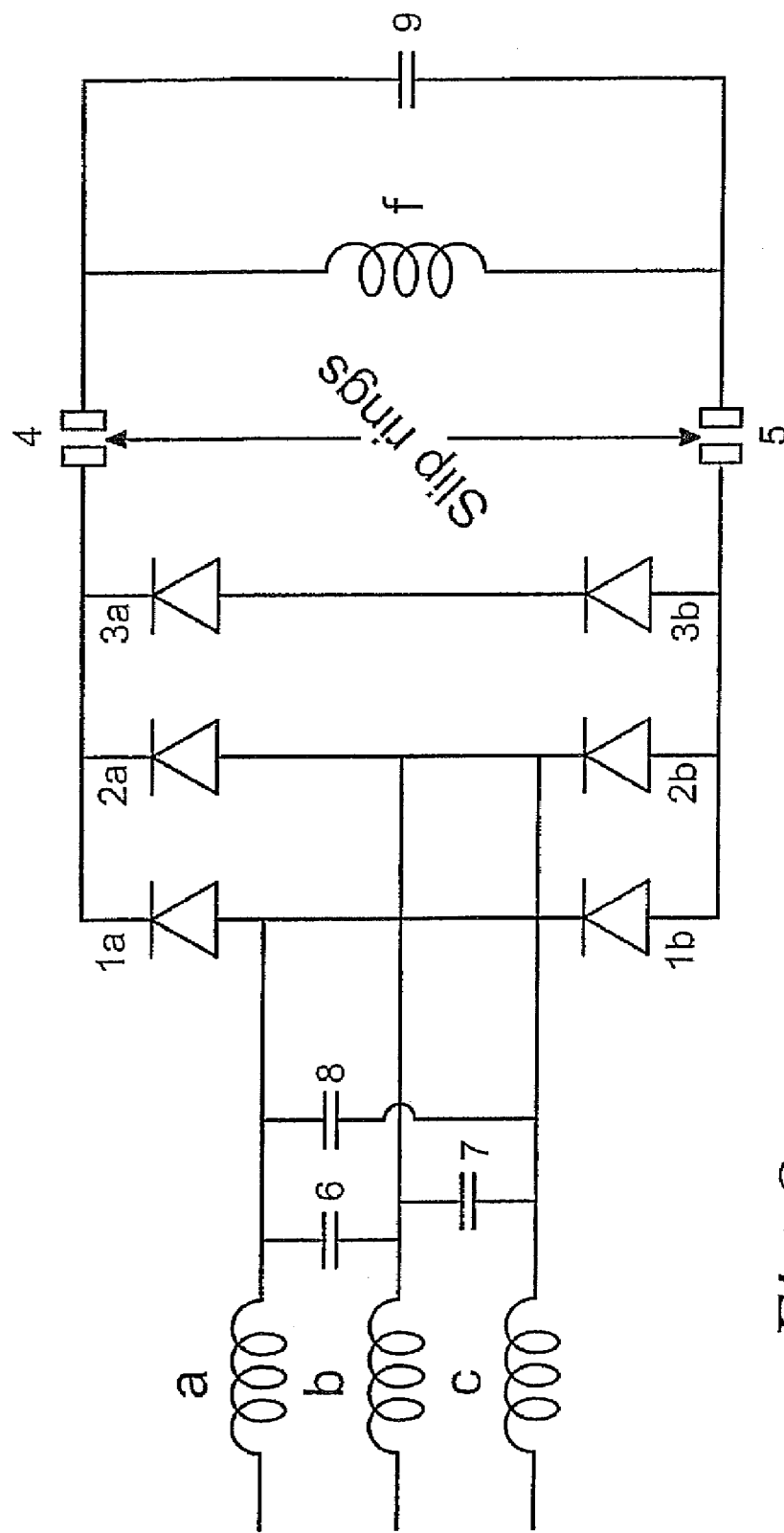
FIG. 3 shows the series magnetized synchronous machine according to the present invention.

FIG. 3 shows the circuit for providing an electric magnetization with current according to the present invention. The different stator windings are denoted a, b, and c, respectively. As seen in the circuit drawing there is a rectifier 1a, 1b; 2a, 2b; and 3a, 3b in series with each of the windings a, b, and c, which thereby feed the field of the rotor winding phasewise via slip rings 4, and 5. Between each line a to b, a to c and b to c there are capacitors 6, 7, and 8 inserted, which capacitors, in a preferred embodiment, work for reducing the field current at high frequencies/revolutions.

The field winding voltage is of the same order of magnitude as the stator winding resistive voltage drop in a PMSM, thus only a small fraction of the supply voltage, expressed as phase- or phase-to-phase voltage in rated operation.

The field current is dependent on the transfer of energy to the field winding. The transfer is can take place via slip rings 4, and 5. The slip rings 4 and 5 may be replaced by any other means for transferring current to the field winding. An alternative is to supply the field to the rotor via magnetic "sliprings" from a field source that is stationary with respect to the rotor, thus avoiding electric sliprings.

A further capacitor 9, such as an electrolyte capacitor, can be placed in parallel with the field winding. The capacitors 6, 7, and 8, connected in star or delta, can replace capacitor 9, or vice verse, or they can be working simultaneously.

It is not only the active stator current of the machine that passes the non-linear means, but also the reactive stator current passes the non-linear means and the field windings. This provides for several different opportunities of controlling the operation of the machine.

The present invention can thereby be used with a field-oriented control, direct torque control, vector control or rotor oriented control-to-control currents, magnetic flux linkages, torque, speed or position of the machine.

Rectifiers of different types can be used, such as a diode, such as a silicon diode, a semiconductor, a selenium rectifier, a thyristor—often a silicon-controlled rectifier or another pnpn device, a thyratron—a gas filled relay, a transistor rectifier, a mercury-vapour rectifier, a metal rectifier, and a mechanical rectifier.

The synchronous machines of the present invention can be used for the same applications as PM-synchronous machines, and EM-synchronous machines. Such applications are e.g., in industrial robots, or air conditioning equipments. The machine can also be used as a generator for the generation of electrical power, particularly for variable frequency derived power.

The present machine can be run on pure net AC current, such as 3-phase 400 V net, but is preferably operated via a power electronic control.

The SMSM can thereby be run on any AC independent on form, such as modified sinus.

The present machine provides a better efficiency than a comparable asynchronous machine and is comparable to the PMSM.

The SM synchronous machine has also turned out to have an effect density comparable to the PMSM.

The SMSM can be construed for the same voltages and effect needs as any PMSM or asynchronous machine (AM).

The invention claimed is:

1. An electrically magnetized synchronous machine comprising an electrically magnetized rotor, and electricity supplied stator windings, wherein it further comprises a non-linear means, optionally controllable, in series with three stator phase windings, whereby a rotor field winding is arranged to be fed exclusively from said non-linear means to form a series magnetized synchronous machine, said non-linear means further comprising a plurality of capacitor elements for reducing field current at high frequencies/revolutions.

2. An electrically magnetized synchronous machine according to claim 1, wherein the non-linear means is rectifying means.

3. An electrically magnetized synchronous machine according to claim 2, wherein the rectifying means is a semiconductor rectifier.

4. An electrically magnetized synchronous machine according to claim 2, wherein the rectifying means is a diode rectifier.

5. An electrically magnetized synchronous machine according to claim 2, wherein the rectifying means is a thyristor rectifier.

6. An electrically magnetized synchronous machine according to claim 2, wherein the rectifying means is a transistor rectifier.

7. An electrically magnetized synchronous machine according to claim 2, wherein the rectifying means is a thyratrone rectifier.

8. An electrically magnetized synchronous machine according to claim 1, wherein the rotor field winding is fed via slip rings.

9. An electrically magnetized synchronous machine according to claim 1, wherein the rotor field winding is fed by means of a flux via magnetic slip rings.

10. An electrically magnetized synchronous machine according to claim 1, wherein the series magnetized synchronous machine is controlled by means of a field oriented control.

11. An electrically magnetized synchronous machine according to claim 1, wherein the series magnetized synchronous machine is controlled by means of a rotor oriented vector control.

12. An electrically magnetized synchronous machine according to claim 1, wherein the series magnetized synchronous machine is controlled by means of a vector control.

13. An electrically magnetized synchronous machine according to claim 1, wherein the series magnetized synchronous machine is controlled by means of a direct torque control.

14. An automotive starter motor comprising an electrically magnetized synchronous machine according to claim 1.

15. An automotive generator comprising an electrically magnetized synchronous machine according to claim 1.

16. An industrial robot motor comprising an electrically magnetized synchronous machine according to claim 1.

17. An air conditioning equipment comprising an electrically magnetized synchronous machine according to claim 1.

* * * * *